United States Patent [19]

Wagner et al.

[11] 4,365,669

[45] Dec. 28, 1982

[54] NON-SOLVENT BONDED PLASTIC WELL SCREEN ASSEMBLY

[75] Inventors: Walter R. Wagner, Minneapolis; Henry E. Benson, Long Lake, both of Minn.

[73] Assignee: UOP Inc., Des Plaines, Ill.

[21] Appl. No.: 229,391

[22] Filed: Jan. 29, 1981

[51] Int. Cl.³ .................... B29C 27/08; E21B 43/08; F16L 47/02

[52] U.S. Cl. .................. 166/231; 156/73.5; 210/497.1; 264/248

[58] Field of Search ............... 166/231, 232, 233, 227, 166/234, 242; 264/248; 156/73.5; 210/497.1, 497.01, 459, 460

[56] References Cited

U.S. PATENT DOCUMENTS

| | | | |
|---|---|---|---|
| 2,933,428 | 4/1960 | Mueller | 156/73.5 |
| 3,499,068 | 3/1970 | Brown | 156/73.5 X |
| 3,883,162 | 5/1975 | Colburn | 166/231 X |
| 3,917,497 | 11/1975 | Stickler | 156/73.5 |
| 4,068,713 | 1/1978 | McGuire | 210/497.1 X |
| 4,262,744 | 4/1981 | Mitchell et al. | 166/227 |

Primary Examiner—Stephen J. Novosad
Attorney, Agent, or Firm—James R. Hoatson, Jr.; Barry L. Clark; William H. Page, II

[57] ABSTRACT

Improved method of joining a rigid thermoplastic fitting to a rigid thermoplastic well screen having longitudinal support rods utilizes pressure and friction generated heat to bond a reduced diameter tubular, rigid thermoplastic sleeve portion of the fitting to the inner surface of the screen. The method permits the joining, without the use of solvents, of screens and fittings of PVC, polypropylene, or ABS, for example, which have the same outer diameters. The sleeve portion of the fitting has an outer diameter which is greater than the inner diameter of the well screen. The assembly method requires that the parts to be mated be rotated rapidly relative to each other as they are forced axially into interfering, telescopic engagement. The overlapping members are fused along a generally conically tapered plane with the material which is melted during rotation being deposited in the circumferential spaces between the screen's support rods.

5 Claims, 4 Drawing Figures

NON-SOLVENT BONDED PLASTIC WELL SCREEN ASSEMBLY

BACKGROUND OF THE INVENTION

The invention relates to plastic well screens and end fittings therefor. Plastic well screens are typically made by wrapping a plastic wire around a series of longitudinal plastic support rods to which the wire is ultrasonically welded. Typically, the threaded end fittings which permit threaded pipe to be attached to the well screens are of substantially greater diameter than the well screens and have internally shouldered recesses in one end into which an axial portion of the screen is inserted and retained by solvent welding. The use of large diameter fittings requires the use of well casing which is substantially larger in diameter than the well screen, and thus quite costly both in material and the labor to drill the well. Alternatively, for a given casing diameter, a substantially smaller diameter well screen must be used where a large diameter fitting must be accommodated.

Plastic well screens made of PVC are often preferred for use in ground water monitoring well applications since they provide good corrosion resistance at low cost. However, the solvents typically used to attach PVC fittings and pipe to PVC screens can leach out and possibly contaminate the ground water that is being monitored, thus detracting from the usefulness of the well.

It is known that certain metal parts can be butt welded to each other by spinning one part relative to another to develop sufficient friction heat to fuse the parts together. However, it would appear that an attempt to butt weld a length of plastic well screen to a tubular plastic fitting would provide a joint which would probably be very weak.

SUMMARY

It is among the objects of the present invention to provide a system and method for attaching a plastic fitting to a plastic well screen without the use of solvents. It is another object to provide a fitting system which has an outer diameter no greater than that of the well screen. It is a still further object to provide a fitting system which is easily assembled to a well screen and very resistant to failure.

The foregoing and other objects are attained by the fitting system and method of the present invention in which a cylindrical portion of a fitting which has a larger diameter than the internal diameter of the cylindrical well screen to which it is to be attached is rotated rapidly relative to the well screen and forced into axial contact with the well screen. The friction developed during rotation of the overlapping members causes portions of each to melt and when the desired depth of telescopic penetration is reached, the relative rotation is stopped, permitting the melted zone of contact to solidify and integrally join the members to each other. When the fitting is to be joined to a well screen which comprises an outer helical wrap wire and a plurality of internal longitudinal rods, the outer diameter of the sleeve portion of the fitting which engages the screen should be slightly less than the inner diameter of the wrap wires so that the principal portions melted will be the longitudinal rods of the screen and a small thickness of the tubular end portion of the fitting. As the screen and fitting are forced in an axial direction relative to each other, each of them will melt and deform in the region where they overlap and interfere with each other. As the fitting moves axially relative to the screen, its leading edge tends to melt away with the result that the further the fitting penetrates telescopically into the screen, the lesser the amount of rod material that will be removed from the screen. This situation provides a somewhat tapered conical plane of fusion between the parts and enhances the ability of the assembly to resist tensile and torsion loads since the melted material is deposited in the circumferential spaces between the rods. Preferably, the relative speed of rotation of the parts to be joined is at least about 1000 r.p.m. when the fitting is of a nominal 2" diameter. It would also appear that the wall thickness of the sleeve portion of the fitting should be at least about 0.125" so that it will remain rigid enough to transmit rotation until the joint is complete. An overlap or interference of about 0.030–0.160" between the outer diameter of the sleeve and the inner diameter of the screen rods seems sufficient as does an axial telescopic overlap of about 0.75 to 1".

DETAILED DESCRIPTION OF THE INVENTION

Figure 1:
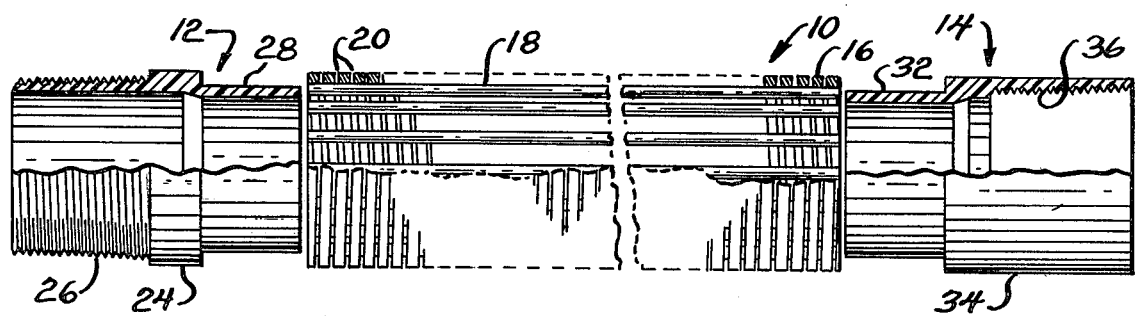
FIG. 1 is a partially sectioned side view showing the relationship between a well screen and its male and female end fittings prior to their assembly to each other.

Referring to FIG. 1, a length of plastic well screen is indicated generally at 10 in alignment with a plastic male fitting 12 and a plastic female fitting 14 to which it may be assembled in accordance with the method of the present invention. The screen 10 is typically made of a rigid thermoplastic material such as PVC, polypropylene or ABS and consists of an outer, helically wound, circumferential wrap wire 16 which is attached at its every juncture with a plurality of circumferentially spaced inner longitudinal rod members 18 by ultrasonic welding, for example. The wire 16 is wrapped at a predetermined pitch so as to form a series of constant width slots 20.

The male fitting 12 may be made by injection molding, for example, from the same plastic used for the screen 10. The fitting 12 is hollow and includes an intermediate portion 24 which preferably has the same outer diameter as the wrap wire 20. It also includes at one end a threaded portion 26 which is adapted to be threaded to a length of standard pipe (not shown) of the same nominal size, and at the other end a reduced diameter sleeve portion 28. The sleeve portion 28 has an outer diameter which is larger than the inner diameter of the screen 10 and slightly less than the inner diameter of the wire wraps 16. Thus, there will be interference when parts 10 and 12 are moved into axial engagement. The female fitting 14 has a sleeve portion 32 which is identical to sleeve portion 28 on fitting 12, but its intermediate portion 34 is longer since it includes an internal female thread 36.

Figure 2:
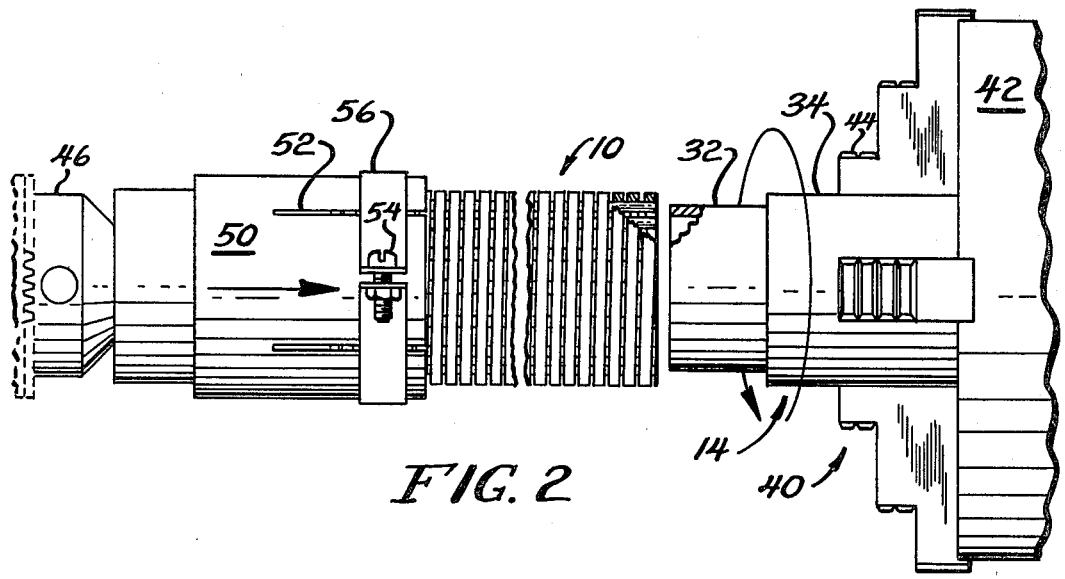
FIG. 2 is a side view of a lathe-type assembly apparatus which may be used to join the well screen of FIG. 1 to one of its fittings at a time.

FIG. 2 illustrates an apparatus 40 in which our improved method can be performed to assemble the screen element 10 of FIG. 1 to one of its end fittings, such as female fitting 14. The apparatus 40 may comprise a conventional lathe having a motor driven headstock 42 and a chuck 44 which engages the peripheral portion 34 of the end fitting 14. The tailstock is represented by a chuck 46 which is fixed against rotation but can be moved axially by a lead screw (not shown). A work holding fixture 50 has an integral pin (not shown) at its left end which is engaged by the chuck 46 and a series of slits 52 at its right end which can expand slightly to accept the screen 10 and then contract to hold it when the screw 54 on strap clamp 56 is tightened. The fixture 50 is preferably long enough so that it can accommodate a fitting which has already been attached to one end of the screen 10.

Figure 3:
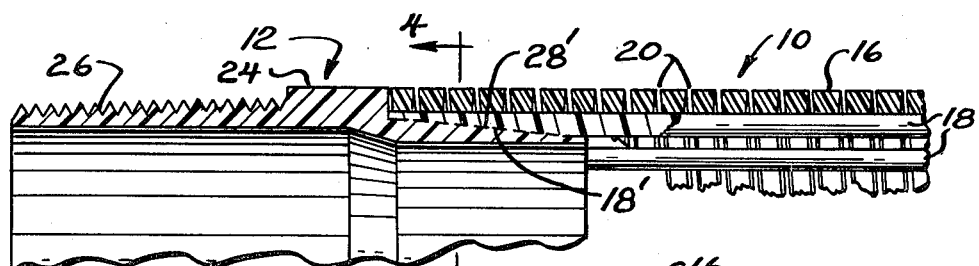
FIG. 3 is an axial cross-section showing the relationship between the well screen of FIG. 1 and its male end fitting after assembly.
Figure 4:
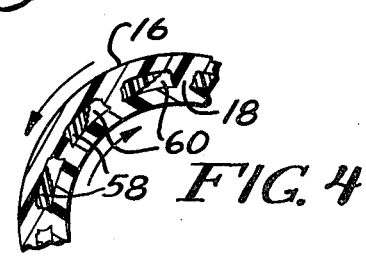
FIG. 4 is a section taken on line 4—4 of FIG. 3.

FIG. 3 illustrates the cross-section of the screen 10 and fitting 12 after they have been assembled and shows that the leading ends 18' and 28' of the screen rods 18 and of the fitting sleeve portion 28 tend to melt as they are moved axially relative to each other. Their generally tapered conical plane of fusion is indicated by a dotted line in FIG. 3. The mixture of melted material 58 from the screen and sleeve which originates in the region of overlap gets moved sideways into the circumferentially spaced locations 60 between the screen rods 18 as seen in FIG. 4.

To produce the assembly shown in FIG. 3 with the apparatus shown in FIG. 2, the fitting 12 would be placed in the headstock 42 so that its outer surface 24 is engaged by the chuck jaws 44 and its sleeve portion 28 projects to the left. The screen section 10 would then be clamped in the fixture 50 carried by the tailstock chuck 46. With the parts to be joined separated, the headstock 42 is brought up to a speed of 1000 r.p.m. or more and the tailstock is then moved to the right until the parts 10 and 12 touch. Movement of the tailstock is then continued until the left end of the screen 10 abuts the right end of the intermediate section 24. Rotation of the headstock 42 should then immediately be stopped to stop the generation of friction heat between parts 10,12, thus permitting the melted regions of the parts to cool and fuse to each other. The rapidity at which melting takes place would relate to many things including the relative surface speed of rotation, the feed rate, the material of which the parts are made, the degree to which the contacting surfaces interfere and the area of contact presented by each part to the other.

We claim as our invention:

1. A non-solvent bonded assembly of a rigid thermoplastic well screen formed of helical wire wraps bonded to a series of circumferentially spaced longitudinal rods and at least one end fitting characterized in that the end fitting and well screen have substantially the same outer diameter, while the fitting has a reduced diameter inner sleeve portion which is telescopically received within one end of the well screen and intimately fused thereto, the plane of fusion between said sleeve portion and said well screen being generally conically tapered along the major portion of the region of telescopic overlap, said sleeve portion having a maximum outer diameter which is greater than the minimum inner diameter of the well screen, said assembly having a fused mixture of the plastic of the sleeve portion and the plastic of the longitudinal rods in the circumferential locations which are between the rods and radially outward of the line of fusion.

2. The assembly of claim 1 wherein the maximum outer diameter of the sleeve portion is at least about 0.030" greater than the minimum inner diameter of the well screen.

3. The assembly of claim 1 wherein the wall thickness of the sleeve portion at a location underlying the end of the well screen is at least about 0.125".

4. The assembly of claim 1 wherein the axial length of the region of telescopic overlap is at least about 0.75".

5. The assembly of claim 1 wherein both the well screen and end fitting are formed of PVC.

* * * * *